United States Patent
Zernickel

[19]

[11] Patent Number: 6,116,109
[45] Date of Patent: Sep. 12, 2000

[54] DEVICE FOR CONVERTING A ROTATIONAL MOVEMENT INTO A RECTILINEAR MOVEMENT

[75] Inventor: Alexander Zernickel, Herzogenaurach, Germany

[73] Assignee: Ina Wälzlager Schaeffler OHG, Herzogenaurach, Germany

[21] Appl. No.: 09/319,501

[22] PCT Filed: Sep. 15, 1997

[86] PCT No.: PCT/EP97/05028

§ 371 Date: Jun. 7, 1999

§ 102(e) Date: Jun. 7, 1999

[87] PCT Pub. No.: WO98/27366

PCT Pub. Date: Jun. 25, 1998

[30] Foreign Application Priority Data

Dec. 14, 1996 [DE] Germany .......................... 196 52 181

[51] Int. Cl.⁷ .............................. F16H 55/17; F16H 1/18
[52] U.S. Cl. ........................................... 74/459; 74/424.8
[58] Field of Search .................. 74/424.8 DM, 74/459

[56] References Cited

U.S. PATENT DOCUMENTS

| | | | |
|---|---|---|---|
| 2,715,925 | 8/1955 | Morgan | 74/459 |
| 2,770,155 | 11/1956 | Morgan | 74/459 |
| 3,062,070 | 11/1962 | Beatty et al. | 74/459 |
| 3,214,993 | 11/1965 | Teramachi | 74/459 |
| 3,884,090 | 5/1975 | Dock . | |
| 4,186,621 | 2/1980 | Brusasco | 74/459 |
| 4,542,661 | 9/1985 | Teramachi | 74/424.8 |

FOREIGN PATENT DOCUMENTS

| | | |
|---|---|---|
| 22 31 541 | 1/1974 | Germany . |
| 28 29 433 C2 | 1/1979 | Germany . |
| 41 31 486 | 3/1993 | Germany . |
| 6 818 189 | 6/1970 | Netherlands . |
| 4 10 542 | 10/1966 | Switzerland . |

*Primary Examiner*—Charles A Marmor
*Assistant Examiner*—Roger Pang
*Attorney, Agent, or Firm*—Henry M. Feiereisen

[57] ABSTRACT

An apparatus for converting a rotational movement into a rectilinear movement includes a threaded spindle, a nut (8) which surrounds the latter concentrically at a spacing, and a number of rolling bodies which are disposed in the spacing and roll on the track-forming outer thread of the threaded spindle as well as on the corresponding track (4) forming inner thread of the nut (8). The rolling bodies are guided by a cage (9) which includes slot-shaped pockets (11) disposed sequentially at spacings in the circumferential direction for receiving the rolling bodies, whereby, during a rotation of the nut (8) relative to the threaded spindle, each rolling body is axially displaceable by the amount of the threaded pitch inside the cage (9). At the conclusion of this rotation inside an axial groove (13) in the nut (8), the rolling body can be returned to its initial position by a cam (15) disposed in the vicinity of an end face of the cage (9). According to the invention, balls (3) are provided as rolling bodies and are respectively disposed in groups in a plurality of cage elements (10), and each cage element (10) is guided for displacement in an axis-parallel manner relative to the threaded spindle within one of the slot-shaped pockets (11) in the cage (9). In this way, a threaded drive is provided which has a simple design and is economical to produce.

15 Claims, 2 Drawing Sheets

DEVICE FOR CONVERTING A ROTATIONAL MOVEMENT INTO A RECTILINEAR MOVEMENT

FIELD OF THE INVENTION

The invention relates to an apparatus for converting a rotational movement into a rectilinear movement, including a threaded spindle, a nut which surrounds the threaded spindle concentrically at a spacing, and a plurality of rolling bodies arranged in this spacing and rolling on the track-forming outer thread of the threaded spindle as well as on the corresponding track-forming thread of the nut, with the rolling bodies being guided by a cage which includes slot-shaped pockets, disposed sequentially at spacings in circumferential direction, for receiving the rolling bodies, wherein during a rotation of the threaded spindle relative to the nut, each rolling body is axially displaceable within the cage by the amount of thread pitch and can be returned to its initial position at the end of this revolution within an axial groove of the nut by a respective cam arranged in vicinity of an end face of the cage.

BACKGROUND OF THE INVENTION

A field of application for a threaded drive of this type for converting a rotational movement into a translational movement is the automobile industry where large-scale production is required while demands on the precision are not of foremost concern. A cost-efficient solution with high degree of efficiency and good load-carrying capability is, however, demanded. German publication DE-OS 21 50 739 discloses such a screw mechanism which has rolling bodies in the form rollers, and includes a massive nut body and two annular cam members which are also massive and have regions with ring-shaped cam surfaces for engagement in ring-shaped recesses on the end face of a cage for the rollers. This design is highly complicated to manufacture, so that a very expensive construction is effected.

German publication DE-OS 22 31 541 discloses a screw mechanism in which a plurality of balls roll between a helical track on a spindle and a helical track of a spindle nut. The spindle nut is made of sheet metal and received in an additional sleeve. For returning the rolling bodies, a circumferential area of the nut has openings to enable the balls to reach the neighboring track winding of the threaded spindle. The additional sleeve is, i.a., required to close the openings to the outside.

SUMMARY OF THE INVENTION

It is an object of the invention to provide a threaded drive which is simple in structure and more cost-efficient to make.

This object is attained in accordance with the invention by arranging as rolling bodies groups of balls in several cage elements, and guiding each cage element for displacement in an axis-parallel manner within one of the slot-shaped pockets of the cage relative to the threaded spindle. This design eliminates the need for an additional sleeve witch surrounds the nut so as to simplify the structure of the threaded drive.

The nut may be a thin-walled sheet metal sleeve formed without cutting. In this manner, a significant material reduction is realized so that the apparatus has a smaller weight.

The sheet metal sleeve, which forms the nut, can be press-fitted in a bore of the housing that receives the apparatus. The press-fit affords the thin-walled, formed without cutting, its precise shape and precise dimensions. Moreover, it can be drawn from a circular blank. During the drawing process, the axial nut for return of the cage elements with the balls can be formed at the same time. The inner thread of the sheet metal sleeve can be made through a roll-forming process.

It is, however, also possible to bend the nut from a sheet metal strip, with the inner thread being previously rolled in. Subsequently, the thus-obtained sleeve is welded along the butt seam.

BRIEF DESCRIPTION OF THE DRAWING

Exemplified embodiments of the invention will now be described in more detail with reference to the drawings, in which.

DETAILED DESCRIPTION OF THE DRAWINGS

Figure 1:
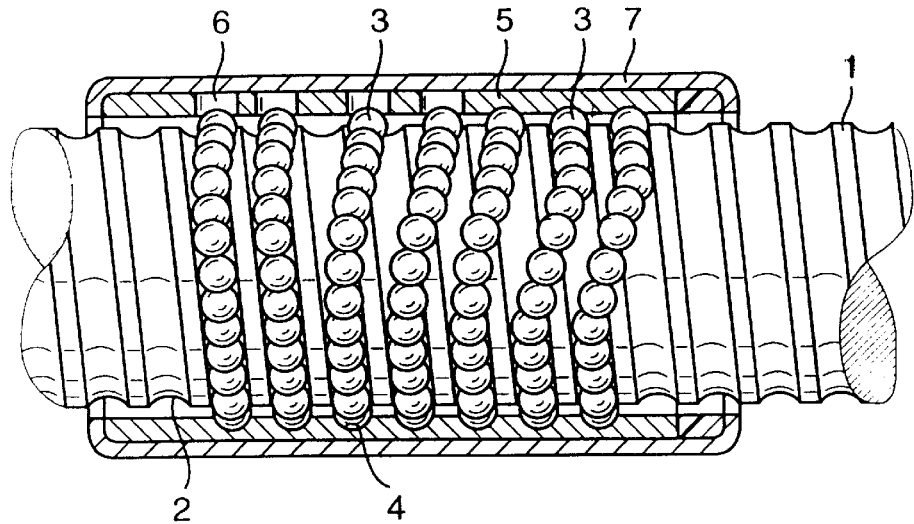
FIG. 1 is a conventional ball-type threaded drive with a threaded spindle and a nut which is arranged in an additional sleeve.

An apparatus for converting a rotational movement into a rectilinear movement includes a threaded spindle 1 which has a circumference formed with a helical track 2 and is surrounded by several balls 3 in engagement with the track 2 of the threaded spindle 1 as well as with a helical track 4 of a nut 5. The nut 5 is arranged concentrically to the threaded spindle 1 and surrounds the latter at a distance corresponding to the balls 3. The return of the rolling bodies is realized in a conventional apparatus by providing the nut 5 with openings 6 in a circumferential area for engagement by the balls 3, thereby disengaging at the threaded spindle 1 from the track 2 to subsequently being able to enter the neighboring track winding of the threaded spindle 1. The closing of the openings 6 to the outside requires the provision of an additional sleeve 7 which surrounds the nut 5.

Figure 2:
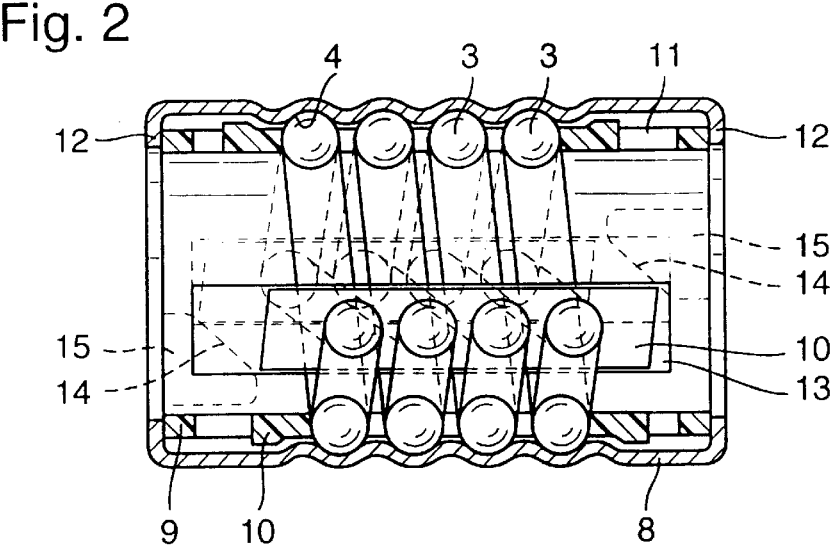
FIG. 2 is a longitudinal section of a ball-type threaded drive according to the invention, with incorporated cage.
Figure 3:
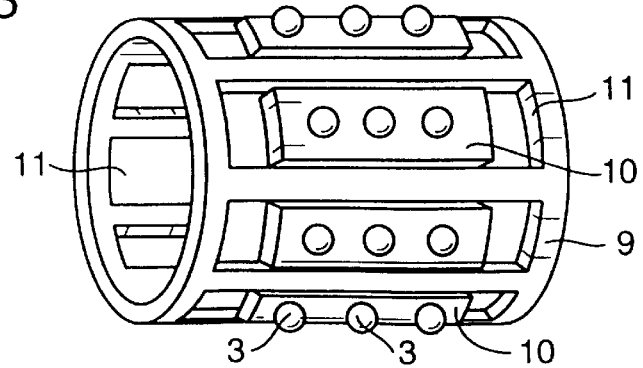
FIG. 3 is a perspective illustration of a cage with incorporated cage elements for the rolling bodies formed as balls.

In contrast thereto, a configuration of the apparatus according to the invention includes a cage 9 and several cage elements 10 for the balls 3 arranged within the nut 8. Although not shown, the configuration of FIG. 2 is also provided with the threaded spindle 1 illustrated in FIG. 1. The cage 9 is a circular cylindrical component which has several slot-shaped pockets 11 arranged sequentially at spacings in circumferential direction. Each pocket 11 extends axis-parallel and receives a cage element 10 that is configured in the shape of a parallelepiped and has several recesses arranged sequentially in axial direction for receiving the balls 3. The cage element 10 is slightly shiftable within the pocket 11 in axial direction. Its use prevents a direct contact of the balls amongst each other and thereby reduces friction.

During rotation of the threaded spindle 1 relative to the nut 8, the balls 3 respectively guided in groups in the cage elements 10 roll along the helical track 2 of the threaded spindle 1 and along the helical track 4 of the nut 8, so that their movement is composed of a circumferential component and an axis-parallel component.

The cage 9 is axially retained within the nut 8 by collars 12 thereof and thus can move only in circumferential direction. Therefore, the axis-parallel movement component effects a displacement of each cage element 10 within its pocket 11 at cage 9 when the threaded spindle 1 is rotated. The movement continues until the cage element 10 enters a respective groove 13 of the nut 8, with its balls 3 being disengaged at the track 2 of the threaded spindle 1. When the cage 9 is further rotated, the cage element 10 impacts a ramp 14 of a cam 15 arranged at one end face of the nut 8 and is pushed backwards in axial direction in the pocket 11 when the cage 9 is further rotated. When the cage element 10 has reached its initial position within the groove 13, the balls 3 engage again the track 2 of the threaded spindle 1.

Figure 4:
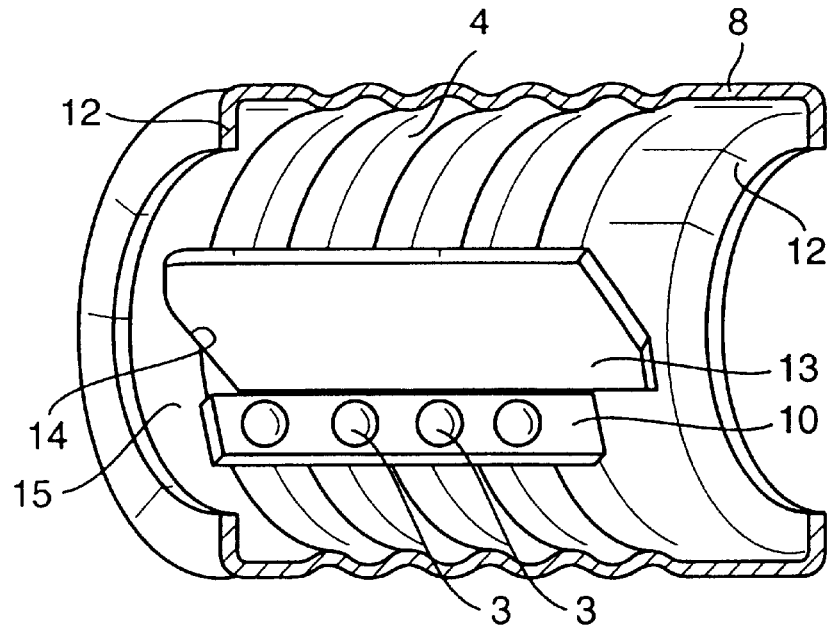
FIG. 4 is a perspective illustration of a half of a nut with an axial groove for return of the rolling bodies.
Figure 5:
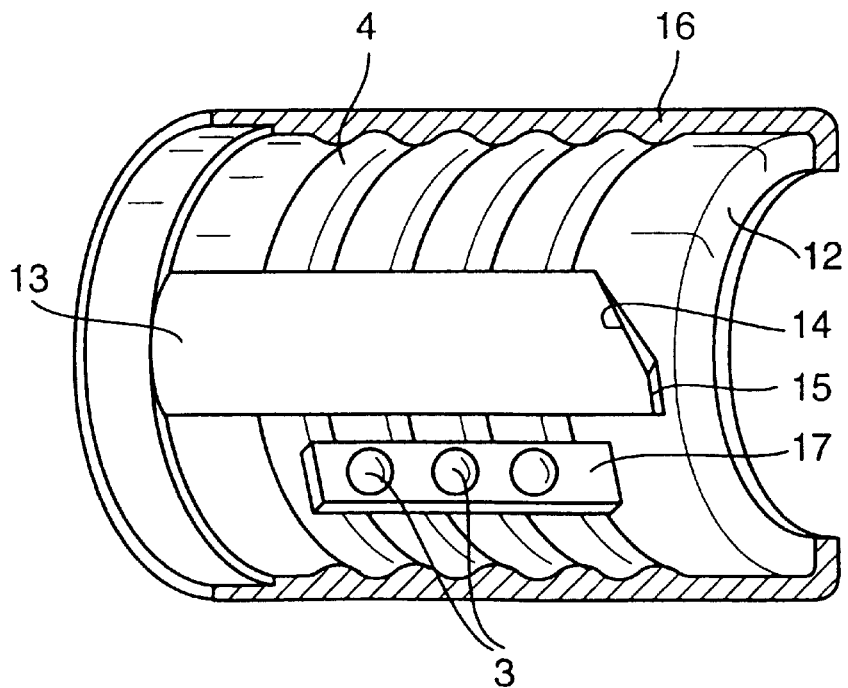
FIG. 5 is a half of a modified nut compared to FIG. 4.

FIG. 4 shows a perspective illustration of a half of the nut 8 of the apparatus according to the invention shown in FIG. 2, with a cage element 10. The cage element 10 is configured for receiving four balls 3. The groove 13 is formed here by being designed as window which is punched out from the nut 8. The balls 3 are restrained by the cage element 10 having restraining elements (not shown), so that the balls are prevented from escaping to the outside through the window-shaped groove 13. FIG. 5 shows the half of a modified nut 16 with a cage element 7 for receiving three balls 3. The groove 13 is formed here through deep-drawing.

What is claimed is:

1. Apparatus for converting a rotational movement into a rectilinear movement, including a threaded spindle, a nut which surrounds the threaded spindle concentrically at a spacing, and a plurality of rolling bodies arranged in this spacing and rolling on a track formed on an outer thread of the threaded spindle as well as on a corresponding track formed on a thread of the nut, with the rolling bodies being guided by a cage which includes slot-shaped pockets, disposed sequentially at spacings in circumferential direction, for receiving the rolling bodies, wherein during a rotation of the nut relative to the threaded spindle, each rolling body is axially displaceable within the cage by an amount of thread pitch and at the end of this rotation within an axial groove of the nut is returnable to its initial position by a respective cam arranged in vicinity of an end face of the cage, wherein the rolling bodies are formed by balls arranged in groups in several cage elements, and each cage element is guided for displacement in an axis-parallel manner within one of the slot-shaped pockets of the cage relative to the threaded spindle.

2. Apparatus according to claim 1, wherein the nut is a thin-walled sheet metal sleeve formed without cutting.

3. Apparatus according to claim 2, wherein the sheet metal sleeve, which forms the nut, receives its final dimensional accuracy and shape through press-fit in a bore of a housing that receives the apparatus.

4. Apparatus according to claim 2, wherein the sheet metal sleeve, which forms the nut, is drawn from a circular blank, and the cam and/or the axial groove for the return of the cage elements containing the balls are formed during the drawing process at the same time.

5. Apparatus according to claim 2, wherein the inner thread of the nut is made through roll-forming.

6. Apparatus according to claim 2, wherein the nut is bent from a sheet metal strip, in which the inner thread is rolled in, and is subsequently welded along the obtained butt seam.

7. Apparatus according to claim 2, wherein the cams for the return of the cage elements containing the balls are formed on a collar which is provided on an end face of the nut formed as sheet metal sleeve.

8. The apparatus of claim 1, wherein the nut has opposite end faces, each end face including a collar having formed thereon a one of said cam for the return of the cage elements.

9. Apparatus for converting a rotational movement into a rectilinear movement, comprising:
a spindle having an outer thread;
a nut positioned in concentric surrounding relationship to the spindle at a spacing thereto and including an inner thread, said inner thread of the nut and said outer thread of the spindle defining a track, said nut configured as a thin-walled sheet metal sleeve made through a non-cutting process and including an axial groove;
a plurality of rolling bodies arranged in the spacing and rolling along the track; and
a cage formed with a plurality of slot-shaped pockets in spaced-apart relation about the circumference of the cage and including a plurality of cage elements which are guided for displacement in an axis-parallel manner and configured for receiving and guiding groups of the rolling bodies, each of the cage elements being disposed in a corresponding one of the pockets, whereby the cage elements and the pockets are placed into one-to-one correspondence, wherein during a rotation of the nut relative to the spindle, each rolling body is axially displaceable within the cage by a thread pitch and, at the end of the rotation, is located within the axial groove of the nut and returnable to its initial position by a cam which is positioned near an end face of the cage.

10. The apparatus of claim 9, wherein the sheet metal sleeve, which forms the nut, receives its final dimensional accuracy and shape through press-fit in a bore of a housing that receives the apparatus.

11. The apparatus of claim 9, wherein the sheet metal sleeve, which forms the nut, is drawn from a circular blank, and wherein at least one of the members selected from the group consisting of the cam and the axial groove, for the return of the rolling-bodies-containing cage elements, is formed during the drawing process at the same time.

12. The apparatus of claim 9, wherein the inner thread of the nut is made through a roll-forming process.

13. The apparatus of claim 9, wherein the nut is bent from a sheet metal strip, in which the inner thread is rolled in, and is subsequently welded along a created butt seam.

14. The apparatus of claim 9, wherein the nut has opposite end faces, each end face including a collar having formed thereon a one of said cam for the return of the cage elements.

15. The apparatus of claim 9, wherein the rolling bodies are balls.

* * * * *